United States Patent
Wysoczynski

(10) Patent No.: US 7,069,334 B2
(45) Date of Patent: Jun. 27, 2006

(54) IMAGE RESTORATION AND RECONFIGURATION SUPPORT FOR CRASHED DEVICES

(75) Inventor: Jacek Piotr Wysoczynski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 09/752,248

(22) Filed: Dec. 27, 2000

(65) Prior Publication Data

US 2002/0083156 A1 Jun. 27, 2002

(51) Int. Cl.
*G06F 15/16* (2006.01)

(52) U.S. Cl. .................................. 709/232; 709/227

(58) Field of Classification Search ............... 709/219, 709/221, 200–206, 227–238; 719/321, 327
See application file for complete search history.

(56) References Cited

U.S. PATENT DOCUMENTS

| | | | |
|---|---|---|---|
| 5,176,520 A | 1/1993 | Hamilton | |
| 5,526,492 A | 6/1996 | Ishida | |
| 5,608,872 A | 3/1997 | Schwartz et al. | |
| 5,649,104 A | 7/1997 | Carleton et al. | |
| 5,696,895 A | 12/1997 | Hemphill et al. | |
| 5,761,419 A | 6/1998 | Schwartz et al. | |
| 5,781,727 A | 7/1998 | Carleton et al. | |
| 5,841,980 A | 11/1998 | Waters et al. | |
| 5,872,923 A | 2/1999 | Schwartz et al. | |
| 5,892,509 A | 4/1999 | Jakobs et al. | |
| 5,907,324 A | 5/1999 | Larson et al. | |
| 5,918,239 A | 6/1999 | Allen et al. | |
| 5,923,844 A | 7/1999 | Pommier et al. | |
| 5,944,785 A | 8/1999 | Pommier et al. | |
| 5,948,022 A | 9/1999 | Carleton et al. | |
| 5,983,263 A | 11/1999 | Rothrock et al. | |
| 6,038,379 A * | 3/2000 | Fletcher et al. ............. | 709/230 |
| 6,047,314 A | 4/2000 | Pommier et al. | |
| 6,061,717 A | 5/2000 | Carleton et al. | |
| 6,182,085 B1 | 1/2001 | Eichstaedt et al. | |
| 6,185,695 B1 | 2/2001 | Murphy et al. | |
| 6,246,444 B1 | 6/2001 | Kim | |
| 6,247,141 B1 | 6/2001 | Holmberg | |
| 6,263,433 B1 | 7/2001 | Robinson et al. | |
| 6,275,953 B1 | 8/2001 | Vahalia et al. | |
| 6,289,385 B1 | 9/2001 | Whipple et al. | |
| 6,292,204 B1 | 9/2001 | Carleton et al. | |
| 6,334,149 B1 * | 12/2001 | Davis et al. ................ | 709/219 |

(Continued)

FOREIGN PATENT DOCUMENTS

EP 899662 A1 * 3/1999

(Continued)

OTHER PUBLICATIONS

The TFTP Protocol (Revision 2), K. Sollins, RFC 1350, 1992, p. 1.*

(Continued)

*Primary Examiner*—Krisna Lim
(74) *Attorney, Agent, or Firm*—Blakely, Sokoloff, Taylor & Zafman LLP

(57) ABSTRACT

Image restoration and reconfiguration support for crashed network devices. The method includes establishing a file transfer session between an information transferring network device that has entered a debug mode and a server. A name of a last known good image and configuration file pair is stored on the network device. The last known good image and configuration file pair is stored on the server. The network device requests a transfer of the last known good image and configuration file pair from the server to the network device.

26 Claims, 3 Drawing Sheets

U.S. PATENT DOCUMENTS

| | | |
|---|---|---|
| 6,341,373 B1 * | 1/2002 | Shaw .................... 717/173 |
| 6,343,313 B1 | 1/2002 | Salesky et al. |
| 6,381,637 B1 | 4/2002 | Kamada |
| 6,397,191 B1 | 5/2002 | Notani et al. |
| 6,412,079 B1 | 6/2002 | Edmonds et al. |
| 6,539,406 B1 | 3/2003 | Ibarra et al. |
| 6,570,590 B1 | 5/2003 | Dubrow et al. |
| 6,574,674 B1 | 6/2003 | May et al. |
| 2003/0159084 A1 | 8/2003 | Murphy et al. |

FOREIGN PATENT DOCUMENTS

| | | |
|---|---|---|
| EP | 1077411 A1 * | 2/2001 |
| EP | 1227400 A2 * | 7/2002 |

OTHER PUBLICATIONS

Sollins, K., *The TFTP Protocol (Revision 2)*, RFC 1350, 1992, pp. 1-10, MIT, U.S.A.

* cited by examiner

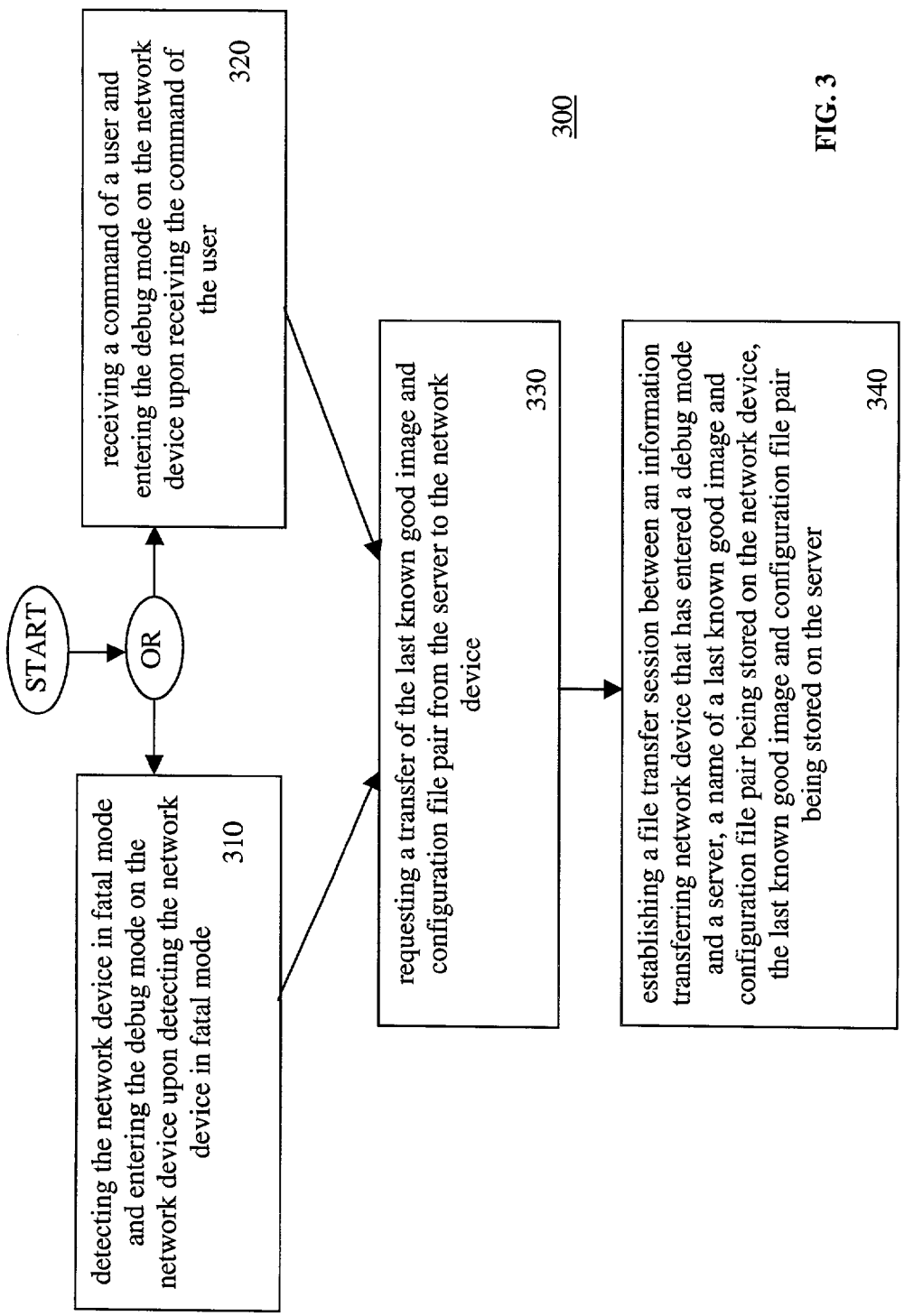

IMAGE RESTORATION AND RECONFIGURATION SUPPORT FOR CRASHED DEVICES

FIELD OF THE INVENTION

The invention relates generally to networked devices. More particularly, the invention relates to image restoration and reconfiguration support for crashed network devices.

BACKGROUND OF THE INVENTION

A network generally includes a number of network devices including, for example, routers, bridges, and switches. Each networked device includes a file referred to as an "image" or "binary image" that is stored in memory and runs on the processor. The image includes information about the functionality of the hardware. Also, each network device needs to be configured in order to operate properly. A configuration file is usually stored on the device.

A network administrator or developer can generally be referred to as the user. A user is generally a person who is responsible for uploading new images, changing configurations, maintaining the network and the network devices and/or adding new features to the network or network devices. From time to time, the user may need to upgrade a firmware version or to reconfigure a network device when changes in the network occur. In the case of upgrades or reconfigurations, as well as in situations in which bugs exist in the running firmware, a "fatal" state may occur. A fatal state is the state the network device enters when running firmware performs an illegal operation due to image corruption, misconfiguration or implementation bugs.

When a fatal action occurs, the device may enter debug mode. Most network devices have the ability to enter debug mode when the fatal action occurs. Debug mode gives the user the opportunity to check the configuration state or memory/register contents to find out what caused the problem. All this can be done via a serial port with the use of console commands. Usually, the user is able to change the image to the proper one or reconfigure the device while in debug mode.

After a fatal action, the user can usually only reset the device. The device will always enter debug mode if problem exists in loaded firmware. To resolve such a problem, the user usually must force a recovery mode or launch an application that properly configures the device. Both approaches have disadvantages.

Entering recovery mode sometimes is needless and undesirable. Recovery mode is a state of the network device that is forced to reset the firmware version and configuration to the factory default. The user typically loses the device configuration so the part of the network depending on that device falls into inoperative state. After a fatal action, launching any configuring application—i.e. a console command interface—in most cases is impossible. Only debug commands work properly.

BRIEF DESCRIPTION OF THE DRAWINGS

The invention is illustrated by way of example, and not limitation, in the figures of the accompanying drawings in which:

FIG. 3 flowchart showing an embodiment of a method of the present invention.

DETAILED DESCRIPTION

Figure 1:
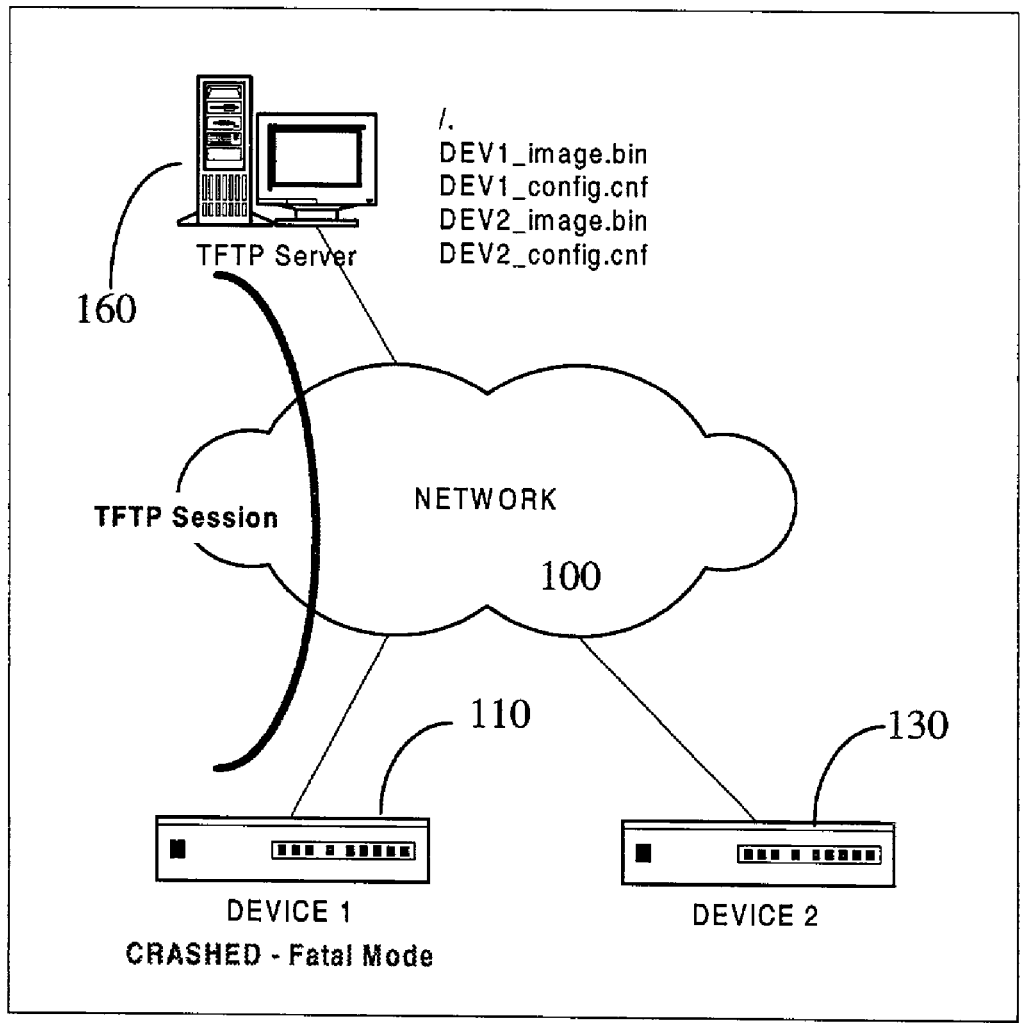
FIG. 1 is diagram of a network and devices in one embodiment of the present invention.

Embodiments of the invention described herein provide methods and apparatuses to automatically configure or update the firmware version on a network device in debug mode. Also, embodiments of the present invention provide methods and apparatuses to restore or reconfigure image or configuration files of network devices working in debug mode. Users can save a good version of the image and configuration files on a server to be accessible at all times.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description which follows are presented in terms of algorithms and symbolic representations of operations on data within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatuses for performing the operations herein. These apparatuses may be specially constructed for the required purposes, or may comprise a general-purpose computer selectively activated or reconfigured by a computer program stored in the computer. Such a computer program may be stored in a machine-readable or accessible storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices, electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
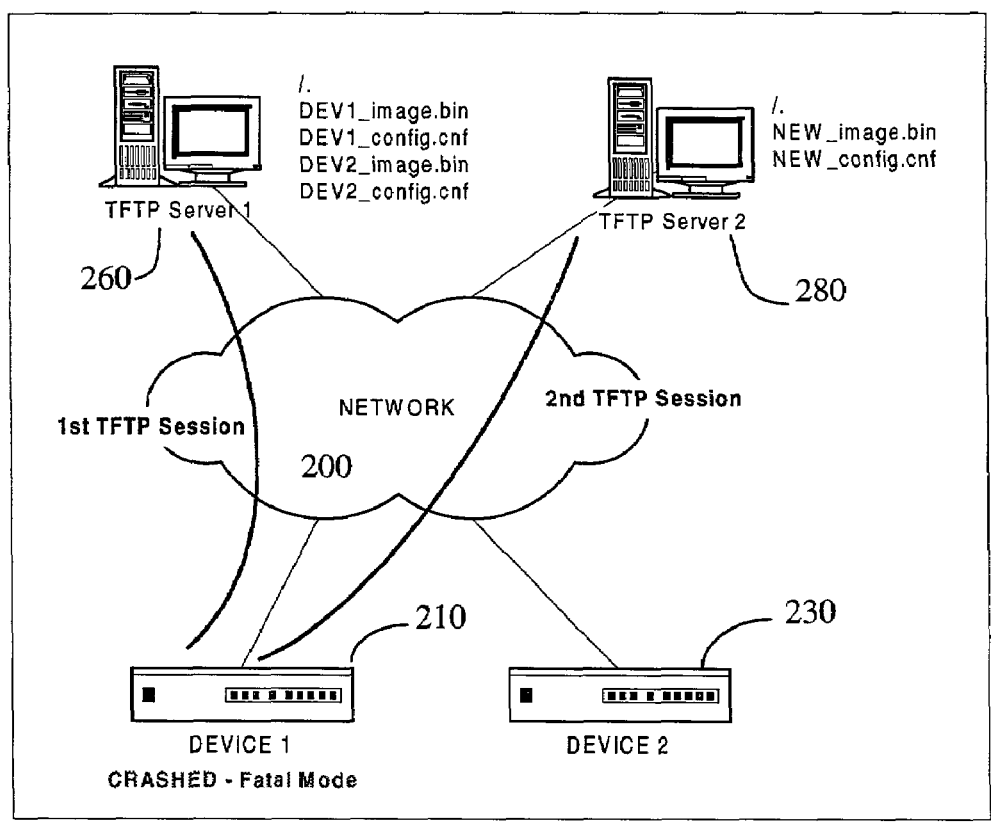
FIG. 2 is diagram of a network and devices in another embodiment of the present invention.

FIGS. 1 and 2 show embodiments of the present invention as applied to exemplary networks having exemplary network devices and servers connected thereto.

Each networked device includes a file referred to as an "image" or "binary image" that runs on the processor of the network device. The image includes information about the functionality of the hardware.

The embodiments of the present invention can apply to information transferring network devices that perform routine forwarding or switching functions in a network. Examples of such devices include routers, bridges, or switches. From time to time, these types of devices may require a new image and configuration files to be installed.

Generally, the present invention is not used to restore, configure, or reconfigure devices such as servers because such devices generally have operating systems, such as UNIX or NT, for example, or other mechanisms such as multi-thread environments that indicate a problem with the system. Information transferring network devices, however, have much simpler operating systems compared to servers, and the crashing or crash recovery mechanism is much simpler.

Most information transferring network devices enter a "fatal mode" when there is a problem. Fatal mode can be entered, for example, when software is running on a device and there is a "fatal action" that is not allowed for the device. This could be a problem with the software. During a fatal action, a display or writing to an event log will show the status of the device and perhaps what may have caused the problem. The display will show registers, memory dump, or stack trace, for example. The user can then see what happened. The device will then reboot and begin running again. There may be a "recovery mode." A fatal event can generally include problems with the stability of the image. Such problem generally include typical software problems such as dividing by zero, a problem with sending frames, problems with memory allocating procedures such as attempting to write unallocated data or attempting to write to a memory location that is occupied by code.

In some cases the user must essentially force the device to act properly by resetting the device manually by pushing a button or entering some command to force the device to load the image and run with default parameters that are not configured by the administrator. However, going back to the default parameters will not recognize configuration information that may have been changed.

In a simple device, manual reconfiguration may take a few minutes. In a more complex device, such as a level 3 switch for example, the user must configure all levels of the device. This may include, for example, the layer 2 forwarder, layer 3 forwarder, IP stack, the layer 3 ports, IP ports, the Open Shortest Path First (OSPF) routing protocol, etc.

This can take a considerable amount of time to perform manually. Also, the configuration must be exact in order for the devices to work properly as a part of the entire network.

The present invention provides an extension of a crash recovery mechanism that uses default configuration parameters written to a computer such as a server, for example, and when the device crashes, the recovery mode can automatically restore the default parameters and then configure the device by taking the image from the server. In this case, the user would write the IP address of the crashed device, the name of the image, and the proper image would be restored to the device.

In the present invention, the server stores the image and configuration files and during the fatal action, recovery mode and restoration of image and configuration is done automatically. The automatic restoration and reconfiguration can be accomplished even in the event that a user or administrator is not available to perform a manual restoration and reconfiguration. The invention allows quick restoration of the network to an operational state if, for instance, an upgrade to a new software version or a reconfiguration fails. The reconfiguration can also be executed with use of one simple command. Alternatively, if the user has problems with a crashed device, he can configure a similar one in a laboratory and save the image and the configuration file on the server to be accessible at all times.

One type of server that can be used in an embodiment of the present invention is a server that uses the Trivial File Transfer Protocol (TFTP). (Sollins, K., "The TFTP Protocol (Revision 2)," RFC 1350, MIT, July, 1992.) A TFTP server has the ability to store files that can be accessible by any client also using the TFTP protocol. Embodiments of the present invention are described with reference to TFTP and TFTP servers. However, any file transfer method can be used to implement the embodiments of the present invention. The file transfer sessions of the present invention are not limited to the use of TFTP or even the File Transfer Protocol (FTP).

FIG. 1 shows an example of a scenario in which a network 100 includes a first device 110 and a second device 130. A server 160 is connected to the network 100. The server has stored on it image and configuration files for both devices 110 and 130.

In FIG. 1, first device 110 has crashed due to a fatal action and enters debug mode. The device reboots and stores information about the events leading to the fatal action. The device 110 also has information stored on it about the last known good image and configuration values that were approved by the administrator or user. The device will also include information such as the names of the last known good image and configuration files, the server IP address, and perhaps gateway information. Preferably, both image and configuration information is stored on the device 110 because the configuration sometimes depends on the version of the software, so the same configuration on two different images may not work.

To recover, the user does not need to define any parameters. Instead, the default server, image version, configuration and the device IP address are used. As the default, the last known good configuration values are taken. One example of a console command in which no parameters are given is as follows:

DEBUG_MODE# reconfigure

Even an inexperienced user can enter this simple command to establish a file transfer session with the server and download the good image and working configuration files that were previously saved. If the server is a TFTP server, the file transfer session will be a TFTP session.

A TFTP mechanism is most commonly used in network devices to load image or configuration files to the device because TFTP is very simple, it needs only the TFTP IP addresses of the servers and the devices or sub-networks, the network mask, and, if the TFTP server is located on another network, a gateway IP address and the file names of the files specified by the TFIP mechanism.

FIG. 2 shows an example of a scenario in which a network 200 includes a first device 210 and a second device 230. A first server 260 and a second server 280 are connected to the network 200. The servers 260 and 280 have stored on them image and configuration files. The devices 210 and 230 also have information stored on them about the last known good image and configuration values that were approved by the administrator or user. The devices may also include information such as the names of the last known good image and configuration files, the TFTP server IP address, and perhaps gateway information. This information can be stored on the devices 210 and 230 in non-volatile memory such as flash memory, for example.

In the scenario shown in FIG. 2, the crashed device 210 had loaded the image and configuration files from the first TFTP server 260 and then it crashed or was rebooted. Different image and configuration information is located on the second TFTP server 280. To load the image and configuration files from the second server 280, a session is established with the second TFTP server 280 by entering its parameters and restoring the configuration. In this scenario, updated image and configuration files can be stored on either server 260 or 280, or any other server that may be connected to the network. The new names of the update files can be loaded onto the devices 210 and 230 so that on the next occasion that the devices enter fatal mode and are rebooted, the will download the latest files.

A more experienced user can choose all desired parameters such as: TFTP server (IP address), image version, configuration file name, new IP address of the device and default gateway IP address. One example of a console command in which parameters can be given is as follows:

DEBUG_MODE# reconfigure <image_name> <config_name> <TFTP_IP> <NEW_IP_ADDR> <GTWY_IP>

Because the image file and the configuration files are uploaded together as a pair, they could have the same name with different extensions. For example, last.img and last.cfg. The devices 210 and 230 will store in their memory information about the last known good image-configuration pair of files when these files are originally uploaded to the devices. Generally, the administrator can provide an indication that particular files are the last known good files. Thus, the last good known files can be loaded onto the devices.

This scenario is particularly useful when choosing a new image or configuration file located somewhere in the network (i.e. when upgrading to a new software version and/or configuration checked previously in the lab). Also, the user may load only a new image and keep an old configuration or change only the configuration while running the same firmware version.

This invention gives the user an easy fallback functionality when an upgrade of the configuration fails in a big network with a huge number of running devices. The last known good configuration and image can be restored on failed devices with a single command. A Technical Support force can easily upload proper versions of image files when problems are solved on-site. Network administrators can make fast uploads and reconfigurations after a network failure. Inexperienced users can easily restore the last known good image version and configuration with use one simple command.

FIG. 3 shows a flowchart of an exemplary embodiments of a method of the present invention in which the various blocks represent operations or procedures to perform the methods.

Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or a produce a result.

An embodiment of a method of the invention can be described with reference to the flowchart shown in FIG. 3, in which an embodiment of the method 300 constitutes processes and operations represented by block 310 until block 340. Embodiments of the method may constitute computer programs made up of computer-executable instructions illustrated as blocks 310 until 340 in FIG. 3.

At the outset, the method 300 can be started in a number of ways. Two examples of processes or operations that can begin the method 300 are shown in blocks 310 and 320. The method 300 does not necessarily require the processes or operations specifically set forth in blocks 310 and 320. Block 310 shows an exemplary process or operation of detecting the network device in fatal mode and entering the debug mode on the network device upon detecting the network device in fatal mode. Block 320 shows the process or operation of receiving a command of a user and entering the debug mode on the network device upon receiving the command of the user. After either process or operation shown in block 310 or block 320, or another similar process or operation, the network device has entered a debug mode.

After entering debug mode, the method 300 can proceed to the process or operation of block 330. Block 330 shows the process or operation of requesting a transfer of the last known good image and configuration file pair from the server to the network device.

In the embodiment shown in FIG. 3, block 340 shows the process or operation of establishing a file transfer session between an information transferring network device that has entered a debug mode and a server, a name of a last known good image and configuration file pair being stored on the network device, the last known good image and configuration file pair being stored on the server.

Although FIG. 3 shows on exemplary flowchart showing blocks 330 and 340 in a particular order, it should be noted that at least the processes or operations shown in those two blocks need not be performed in the order shown in FIG. 3.

Method 300 can further include receiving the transfer of the last known good image and configuration file pair from the server to the network device. Also, method 300 can include restoring the network device from debug mode to working mode after receiving the transfer of the last known good image and configuration file pair from the server to the network device.

What is claimed is:

1. A method comprising:
   establishing a file transfer session between an information routing network device that has entered a debug mode and a server, the network device storing an identifier corresponding to a last known good image and configuration file pair stored on the server;
   requesting a transfer of the last known good image and configuration file pair from the server to the network; and
   automatically reconfiguring the network device according to the last known good image and configuration file pair from the server.

2. The method of claim 1 further comprising detecting the network device in fatal mode and entering the debug mode on the network device upon detecting the network device in fatal mode.

3. The method of claim 1 further comprising receiving a command of a user and entering the debug mode on the network device upon receiving the command of the user.

4. The method of claim 1 wherein the file transfer session is a Trivial File Transfer Protocol (TFTP) session.

5. The method of claim 1 further comprising receiving the transfer of the last known good image and configuration file pair from the server to the network device.

6. The method of claim 5 further comprising automatically restoring the network device from debug mode to working mode after receiving the transfer of the last known good image and configuration file pair from the server to the network device.

7. The method of claim 1 wherein establishing a file transfer session between an information routing network device that has entered a debug mode and a server includes
   establishing a first file transfer session with a first server, a first image and configuration file pair being stored on the first server,
   determining whether the first image and configuration file pair is the last known good image and configuration file pair,
   establishing a second file transfer session with a second server, a second image and configuration file pair being stored on the second server,
   determining whether the second image and configuration file pair is the last known good image and configuration file pair, and
   wherein the method further includes requesting a transfer of one of the first or second image and configuration file pair that is the last known good image and configuration file pair from the server to the network device.

8. A method comprising:
   detecting that an information routing network device has entered a debug mode, a name of a last known good image and configuration file pair being stored on the network device;
   establishing a first file transfer session between the network device and a first server, a first image and configuration file pair being stored on the first server;
   determining whether the first image and configuration file pair matches the last known good image and configuration file pair;
   establishing a second file transfer session between the network device and a second server, a second image and configuration file pair being stored on the second server;
   determining whether the second image and configuration file pair matches the last known good image and configuration file pair;
   establishing a second file transfer session with a second server, a second image and configuration file pair being stored on the second server,
   determining whether the second image and configuration file pair is the last known good image and configuration file pair, and
   wherein the method further includes requesting a transfer of one of the first or second image and configuration file pair that is the last known good image and configuration file pair from the server to the network device.

9. The method of claim 8 further comprising detecting the network device in fatal mode and entering the debug mode on the network device upon detecting the network device in fatal mode.

10. The method of claim 8 further comprising receiving a command of a user and entering the debug mode on the network device upon receiving the command of the user.

11. The method of claim 8 wherein the file transfer session is a Trivial File Transfer Protocol (TFTP) session.

12. The method of claim 8 further comprising receiving the transfer of the last known good image and configuration file pair from the server to the network device.

13. The method of claim 12 further comprising automatically restoring the network device from debug mode to working mode after receiving the transfer of the last known good image and configuration file pair from the server to the network device.

14. An apparatus comprising a machine accessible medium containing instructions which, when executed by a machine, cause the machine to perform operations comprising:
   establishing a file transfer session between an information routing network device that has entered a debug mode and a server, the network device storing an identifier corresponding to a last known good image and configuration file pair stored on the server;
   requesting a transfer of the last known good image and configuration file pair from the server to the network device; and
   automatically reconfiguring the network device according to the last known good image and configuration file pair from the server.

15. The apparatus of claim 14 further comprising detecting the network device in fatal mode and entering the debug mode on the network device upon detecting the network device in fatal mode.

16. The apparatus of claim 14 further comprising receiving a command of a user and entering the debug mode on the network device upon receiving the command of the user.

17. The apparatus of claim 14 wherein the file transfer session is a Trivial File Transfer Protocol (TFTP) session.

18. The apparatus of claim 14 further comprising receiving the transfer of the last known good image and configuration file pair from the server to the network device.

19. The apparatus of claim 18 further comprising automatically restoring the network device from debug mode to working mode after receiving the transfer of the last known good image and configuration file pair from the server to the network device.

20. The apparatus of claim 14 wherein establishing a file transfer session between an information routing network device that has entered a debug mode and a server includes
   establishing a first file transfer session with a first server, a first image and configuration file pair being stored on the first server,
   determining whether the first image and configuration file pair is the last known good image and configuration file pair, determining whether the second image and configuration file pair matches the last known good image and configuration file pair;

requesting a transfer of one of the first or second image and configuration file pair that is the last known good image and configuration file pair from the server to the network device; and automatically reconfiguring the network device according to the last known good image and configuration file pair from the server.

21. An apparatus comprising a machine accessible medium containing instructions which, when executed by a machine, cause the machine to perform operations comprising:

detecting that an information routing network device has entered a debug mode, a name of a last known good image and configuration file pair being stored on the network device;

establishing a first file transfer session between the network device and a first server, a first image and configuration file pair being stored on the first server;

determining whether the first image and configuration file pair matches the last known good image and configuration file pair;

establishing a second file transfer session between the network device and a second server, a second image and configuration file pair being stored on the second server;

requesting a transfer of one of the first or second image and configuration file pair that is the last known good image and configuration file pair from the server to the network device; and automatically reconfiguring the network device according to the last known good image and configuration file pair from the server.

22. The apparatus of claim 21 further comprising detecting the network device in fatal mode and entering the debug mode on the network device upon detecting the network device in fatal mode.

23. The apparatus of claim 21 further comprising receiving a command of a user and entering the debug mode on the network device upon receiving the command of the user.

24. The apparatus of claim 21 wherein the file transfer session is a Trivial File Transfer Protocol (TFTP) session.

25. The apparatus of claim 21 further comprising receiving the transfer of the last known good image and configuration file pair from the server to the network device.

26. The apparatus of claim 25 further comprising automatically restoring the network device from debug mode to working mode after receiving the transfer of the last known good image and configuration file pair from the server to the network device.

* * * * *